April 27, 1971
G. HUTZ
3,576,692
PLANT FOR THE PRODUCTION OF INTEGRATED LAMINATES
Filed June 17, 1968
4 Sheets-Sheet 1
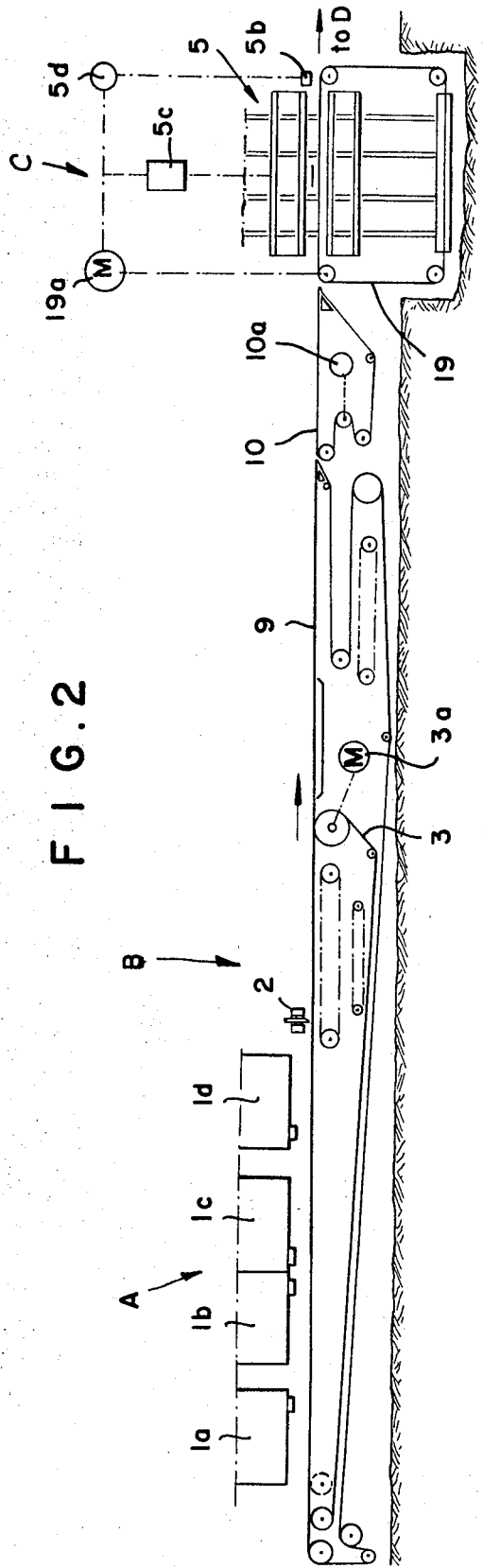
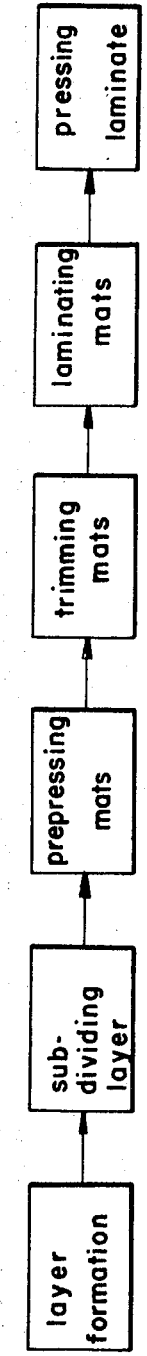
Gerhard HUTZ
INVENTOR.
BY
*Karl F. Ross*
ATTORNEY

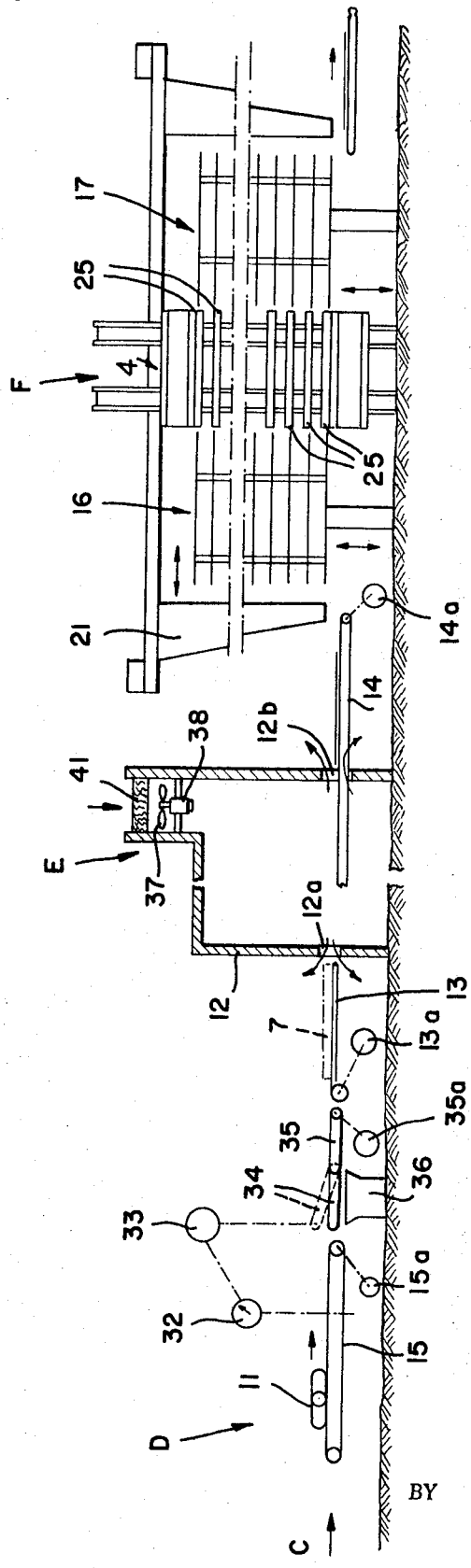

April 27, 1971 G. HUTZ 3,576,692
PLANT FOR THE PRODUCTION OF INTEGRATED LAMINATES
Filed June 17, 1968 4 Sheets-Sheet 3

Gerhard HUTZ
INVENTOR.

BY

Karl F. Ross
ATTORNEY

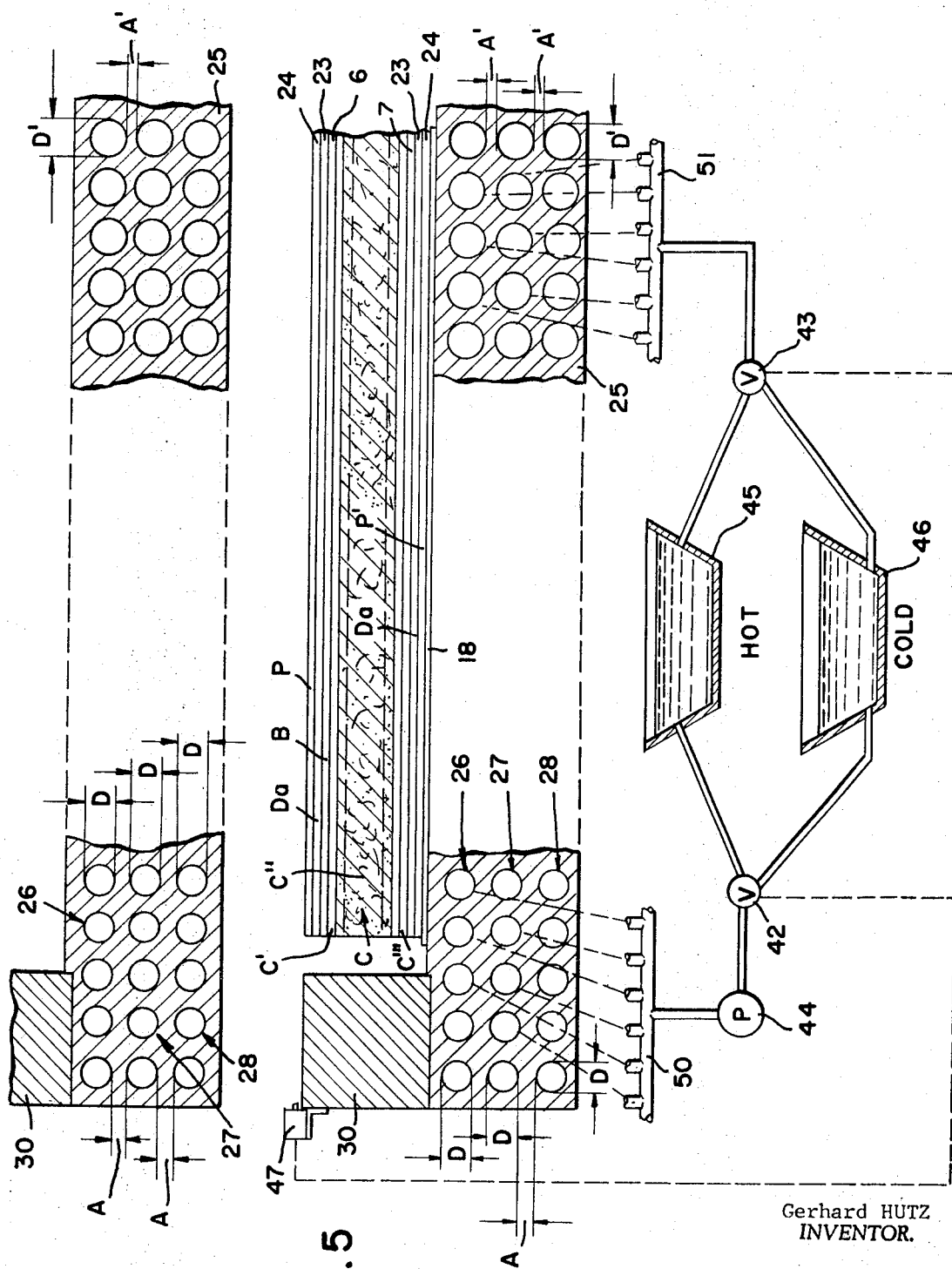

United States Patent Office 3,576,692
Patented Apr. 27, 1971

3,576,692
PLANT FOR THE PRODUCTION OF INTEGRATED LAMINATES
Gerhard Hutz, Suchteln, Germany, assignor to
G. Siempelkamp & Co., Krefeld, Germany
Filed June 17, 1968, Ser. No. 737,465
Claims priority, application Germany, Dec. 30, 1967,
S 113,586, S 113,587, S 113,588
Int. Cl. B29j 5/00, 5/08
U.S. Cl. 156—369
6 Claims

ABSTRACT OF THE DISCLOSURE

A loosely coherent fiber mat is stacked with a plurality of laminae and subsequently pressed in a heated press. This press is only heated during the pressing operation and is cooled beforehand and afterwards.

---

My present invention relates to an apparatus for the production of pressed laminates.

To produce a pressed laminate with a fiber substrate, the customary method is to make a normal (coherent) fiber or pressed board, to sand and clean it, and then to press laminae onto the finished board in a second pressing operation.

More particularly, the fiberboard is prepared in the manner known in the art, is pressed in a multistage platen press and then is passed to a finishing plant wherein its surfaces are sanded or polished to prepare it for application of a lamina or of laminae for decorative or protective purposes. The abrasion products are removed and the lamina or laminae are stacked on this finished fiberboard prior to a second pressing operation in a second multiplaten press.

The finishing operation is expensive and time-consuming, and the cost of a second multiplaten press greatly contributes to elevating the cost of the final laminated fiberboard. In addition, these later-applied laminae often are not well integrated with the fiberboard core due to the thermosetting qualities of many of the resins used as binders in the commonly known fiberboards and due to the fact that they cannot bind well to a finished, hard surface.

It is an object of my invention to produce an improved pressed laminate by an apparatus simpler than the one mentioned above.

This is done by the expedient of applying the laminae to a mat of loosely coherent comminuted material rather than to a finished fiberboard, and by heating the final press only during compression of this mat with its laminae, and cooling it immediately thereafter.

In particular, I have found that it is only necessary to prepare a loosely coherent mat of comminuted material upon which the laminate are stacked and/or which is stacked on the laminae prior to the final pressing. I have also found it advantageous to have the original comminuted material deposited by a plurality of hoppers to form a succession of layers of comminuted matter with finer particles on the top and on the bottom than in the center, the plurality of hoppers also compensating statistically for each other's minor inequalities of feed, thereby producing a very even layer.

This carefully deposited layer is trimmed by means known in the art and subsequently rendered slightly coherent by such means as a single level press. Then it is stacked with one or more laminae according to the desired finished product, and this stack is loaded into a press which heats during the compression operation.

According to an important feature of this invention, the laminae are stacked on the loosely coherent fiber mat in a dust-free chamber. This prevents endangering the quality of the finished product by air-borne dust which would readily adhere to the laminae due to the unavoidable electrostatic forces generated especially when paper, synthetic-resin or metallic foils are used as laminae.

The press preferably used for the final pressing is of the multiplaten type and is advantageously equipped with platens which can be easily heated and cooled. These platens are cooled to a temperature below the softening or melting point of the laminae or their binders and are heated only when the pressing operation itself is commenced. This prevents any part of the laminates from being heated more than others.

Still another important feature of the invention, in combination with those discussed earlier, resides in an arrangement whereby the platens of the press are also equipped with edge spacers to ensure very exact compression of the laminates by maintaining the platens at an exact spacing. This also makes for a finished pressed laminate whose surfaces are almost perfectly parallel to each other.

The advantage of doing the major pressing in one operation is that the final pressed laminate is extremely well integrated, all layers being equally well bonded to each other. When two pressing operations are conducted, the fibrous substrate is often imperfectly bonded to the laminations since the surface onto which the laminations must bond are hard and unified whereas with my method these surfaces are still somewhat soft thereby providing a better bonding surface for the laminae. Heating the platens of the press only during the pressing operation also provides for a more even bonding.

The platens of the press are formed with a plurality of bores parallel to the pressing surfaces. A heating or cooling fluid is pumped through these bores which are preferably of larger diameter near the center of the platens than near the edges for best heat-exchange results.

These features of my invention and others which will become apparent are described below with reference to the drawing in which:

FIG. 1 is a block diagram illustrating the steps of the process according to my invention;

FIG. 2 is a schematic partial side view of the first stages of a plant for carrying out my method;

FIG. 3 is a view similar to FIG. 2 showing the final stages;

FIG. 5 is a sectional side view in enlarged scale of a detail of FIG. 3.

Figure 4:
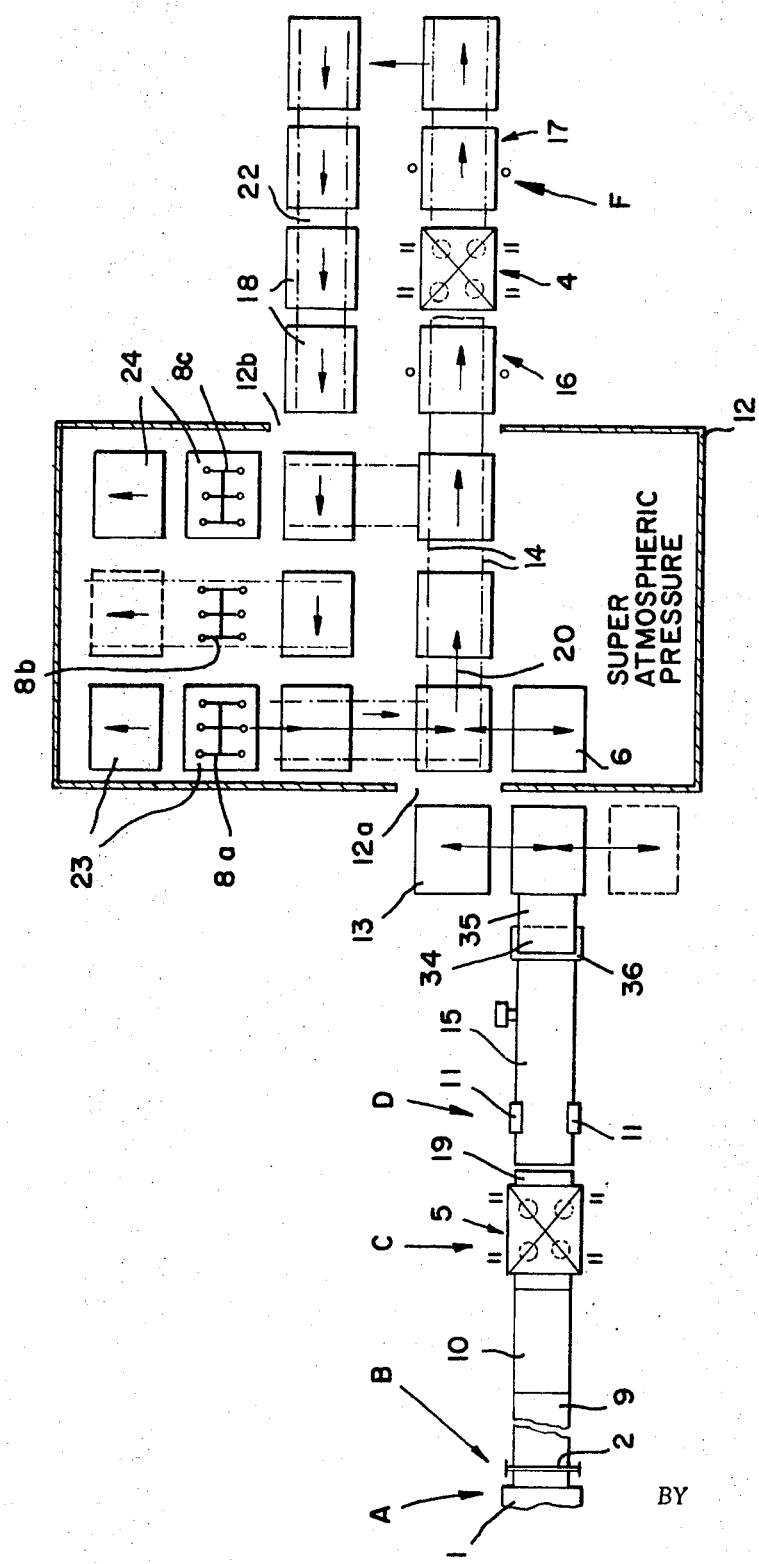
FIG. 4 is a schematic top plan view of a portion of the plant shown in FIGS. 2 and 3.

As will be apparent from the drawing, the initial step of the present process (FIG. 1) is represented as step A and involves the formation of a continuous layer of comminuted material by hoppers 1a, 1b, 1c and 1d (FIG. 2) located above a conveyer belt 9 driven by a belt 3 whose motor is shown at 3a. These hoppers 1a, 1b, 1c and 1d may be similar to those of U.S. Pat. No. 3,224,758.

This layer is subdivided into separate mats, step B, by a slicing mechanism 2 also similar to the one of U.S. Pat. No. 3.224,758.

Before step C, prepressing of the mats, the individual mats pass over a speed-change belt 10 powered by a motor 10a as in my commonly owned copending application Ser. No. 712,687, filed Mar. 13, 1968 and entitled "Apparatus for the Manufacture of Pressed Boards" (now U.S. Pat. No. 3,482,675 of Dec. 9, 1969). The prepressing is done by a prepress 5 through which a stainless-steel belt 19 runs powered by a motor 19a. The press 5 is powered by a hydraulic unit 5c which, with the motor 19a, is connected through a control device 5a to a sensor 5b located at the mat level. The press 5 may be that described in commonly owned copending application Ser. No. 458,228 filed May 24, 1965 by E. Siempelkamp and entitled "Method of and Apparatus for the Production of Pressed Board" (now U.S. Pat. No. 3,428,505 of Feb. 18, 1969).

Step D, trimming of the mats, uses a lateral trimmer 11 (see U.S. Pat. No. 3,224,758) located above a belt 15 driven by a motor 15a. Further downstream of this trimmer 11 is a second sensor connected here to an actuation unit 33 for lifting a section 34 of a belt 35 over a chute 36. A motor 35a drives the belt 35.

The lamination step E, which will be more fully described below, is carried out downstream of the belt 35 after passage of the mats 7 onto a conveyor pallet 13 which can pass them into a high-pressure chamber 12 associated with an air cleansing and pressurizing unit comprising a fan 37 driven by a motor 38 and associated with a filter 41.

The final pressing step F is carried out by a platen press such as that shown in the U.S. Pat. No. 3,050,777. The press may be fed from a charging rack 16 and discharged onto an unloading rack 17 similar to those in U.S. Pat. 3,379,322.

An integrated pressed laminate is made in the following manner by the above-described plant:

A relatively smooth layer of comminuted or fibrous matter is continuously deposited on the belt-receiving surface formed by the conveyor 9. The hoppers 1a and 1d are filled with finer comminuted matter than the hoppers 1b and 1c so that the deposited layer is consequently coarser in the middle than at the upper and lower surfaces. Also, because of the use of a plurality of hoppers 1a–1d, the succession of layers gives rise to a band which is quite smooth, any inconsistencies of feed of one hopper being compensated for by the others.

The saw 2 cuts this continuous layer transverse to its direction of travel to form a plurality of incoherent mats, and the spacing between the mats is increased by the speed-change belt 10 (see commonly owned application Ser. No. 702,026 filed Jan. 31, 1968 by E. Siempelkamp and entitled "Pressed-Board Plant and Method of Operating Same").

The mats are, one by one, passed onto the conveyor belt 19 running through the press 5. Just before the leading edge of a mat exits from the press, it triggers the sensor 5b which activates, through the control unit 5a, the unit 5c for closing the press 5 and stopping the belt 19. The mat is quickly pressed, the press 5 opens, and the belt 19 starts moving again to pass it on to the next step.

After pressing, the still loosely coherent mat is trimmed along its longitudinal edges i.e. in the direction of travel, (by the trimmer 11) as it moves on the belt 15.

On passing under the conventional sensor 32 it is scanned and, when an imperfection is found, the sensor 32 triggers the raising of the section 34 so that the imperfect mat drops into the chute 36.

The mat that is not rejected by the quality control station 32, 33, 34, 36 is passed onto the conveyor tablet 13 (see my abandoned application Ser. No. 712,702). This entire tablet can move laterally and longitudinally to the direction of travel of its belt to be able to deposit a mat 7 on the conveyor 14 running through the high-pressure chamber 12.

The fan 37 sucks air in through the filter 41 so that this chamber 12 is slightly pressurized with dust-free air which exits through the openings 12a–b. In this manner the contamination problems caused by the thin laminae are eliminated making for a high quality end product.

Circulating in and out of this chamber 12 through the opening 12b are a plurality of charging plates 18 carried on a conveyer path 22 including the conveyor belt 14. Three vacuum lifters 8a, 8b and 8c move back and forth as shown in FIG. 4 above the conveyer paths and respective stacks of laminae 23 and 6 and laminae 24. These vacuum lifters 8a, 8b and 8c can be raised and lowered over the stacks in conjunction with control of their suction to lift a lamina 23, 24 or 6 or even a charging plate 18 and deposit it in another position. Thus as one of the charging plates 18 passes along the conveyer path 22, the lifter 8c can deposit a lamina 24 on it, the lifter 8a can deposit another lamina 23 on top of that, the two laminae 23 and 24 being different depending on the finished product desired. Then the conveyor pallet 13 can deposit the prepressed mat 7 on these laminae and the lifter 8a can deposit a lamina 6 on top of that and then another lamina 23. On further passage through the chamber in the direction of an arrow 20, the lifter 8c can drop still another lamina 24 on this stack, thus making a seven-layer laminated board ready for pressing (such as the one shown in FIG. 5). Of course, there may be more or fewer laminae, or they may not be on both sides of the fiber mat according to the programming of the conveyor 22 and the lifters 8a and 8c. The lifter 8b may be used in case something causes the supply of prepressed mats 7 into the chamber 12 to be interrupted. In this case it picks the plates 18 up off the conveyer 22 and deposits them in position 48 where they are ready for recirculating when the supply of prepressed mats 7 resumes. Stacking plates may also be used in conjunction with the charging plates 18 for holding of stacks, manufacture of double-thickness boards, or the like.

The laminated board illustrated in FIG. 5 thus comprises a core C formed by an upper layer of relatively fine comminuted material (C') such as finely divided or powdered sawdust, by one or more intermediate layers C" of relatively coarse comminuted material such as wood chips, exploded wood fiber and the like as deposited from the hoppers 1b and 1c, and by a final layer C''' of finely divided material similar to that formed at C'. I have found that, because of the use of extremely fine comminuted material such as wood powder for the outer layer C' and C''', special cushioning foils need not be used and high-quality laminates are obtained. In fact, the quality of such laminates is analogous to those made by the most careful finishing of preformed pressed board by sanding, cleaning or polishing the surfaces of such board prior to the application of laminae thereto. The bond of the foil layer of the instant system, however, is still greater because the synthetic resin or other bonding agent becomes substantially monolithic with the fiber and the superimposed foil in the system of the present invention.

Above the upper layer C' of finely divided comminuted material, I may provide a thin foil 6 of a bounding agent, e.g. a thermoplastic or thermosetting resin which is represented at B and may be flowable under the heat and pressure of the press, to secure the other laminae to the substrate while serving at least in part as a binder for the layer. A similar bonding layer B' may be applied between the layer C''' of finely divided material and the backing foils. A decorative metallic or paper foil D may be bonded by the layer B to the core C while an outer transparent protective layer P (e.g. a polyurethane foil) may be simultaneously bonded to the metal or paper foil D. In this case, the upper surface of the board illustrated in FIG. 5 will be that exposed to view. When both surfaces of the board are intended to be seen and must be aesthetically pleasing, a decorative layer D' and a protective layer P' are used. When the backing surface of the board is not intended for public view, the protective layer P' and the decorative layer D' may be replaced by a single-core paper foil. These are the foils constituting the laminae 6, 23 and 24 previously described and discussed in greater detail below.

On leaving the chamber 12, the stack of laminae 23, 24, 6 and mat 7 are loaded onto the charging rack 16 as discussed in the U.S. Pat. No. 3,379,322 or application Ser. No. 702,026, and from thence they are loaded into the platen press 4 resembling that of the U.S. Patent No.

3,050,777. The discharging rack 17 is also constructed as described in U.S. Patent No. 3,379,322. Here, however, the plate 18 is fed into the press along with the laminate. After pressing, the pressed laminate is separated from the plate 18 and the plate is recirculated as represented at 22 while the finished laminate is further trimmed or just stacked awaiting delivery.

In order to attain a high-quality pressed laminate with well integrated laminae, the press 4, according to my invention, is constructed as shown in FIG. 5; the platens 25 are separated by spacers 30 which make for a finished pressed laminate with parallel surfaces. This eliminates many of the problems often caused by unequal closing or abutting platens, problems which have proved especially troublesome in laminations systems. In addition, a heating and cooling arrangement is provided for the press 4. The platens 25 of the press 4 are formed with a multitude of bores 26, 27, and 28 throughout them. These bores are provided at their ends with manifolds 50 and 51 and are here connected through a pump 44 and two valves 42 and 43 to two reservoirs 45 and 46 containing, respectively, a heated and cooled liquid. These valves 42, 43 are controlled by a switch 47 that is actuated on the closing of the platens 25 to connect the bores 26, 27, 28 up to the hot-liquid reservoir 45 and the pump 44 and, in an open condition of the platens 25, to the cold liquid reservoir 46.

In this manner the platens 25 are cool or being cooled whenever they are opened, that is, whenever they are being loaded or unloaded. However, they heat when closed to integrate the laminations being pressed between them. This eliminates the possibility of heating one part of a lamina more than another, since the heating only sets in upon closing of the press 4, all platens 25 being cooled or at least relatively chilled during loading. In addition, the cooling subsequent to heating makes for a pressed laminate which, on removal from the press 4, is stiff, not one still hot and somewhat pliable. This also circumvents the necessity of extra careful unloading, since the chilled pressed laminates are reasonably durable.

For best effect the bores 26–28 near the edge of the platen 25 have a diameter D of some 30 mm. in a platen 25 of a thickness of 100 mm. of greater, with a space A between them of around 5 mm. This diameter D becomes a slightly larger diameter D' toward the center of the platen 25 while the space A becomes a corresponding smaller spacer A'. In this manner a most effective heat-exchange medium to platen-cubic-volume ratio is attained, and the platens 25 are most quickly heated with a minimum of energy loss while not appreciably losing mechanical strength.

The charging plates 18 can be dispensed with altogether, especially if a charging pack 16 such as the one of commonly owned U.S. Patent No. 3,428,505 is used.

The improvement described and illustrated is believed to admit of many modifications within the ability of persons skilled in the art, all such modifications being considered within the spirit and scope of the invention except as limited by the appended claims.

I claim:

1. An apparatus for the production of laminated pressed boards, said apparatus comprising:

conveyor means forming an advancing receiving surface and dispensing means for depositing a succession of layers of comminuted material on said surface of said first conveyor means in a substantially continuous band;

mat-forming means ahead of said dispensing means in the direction of advance of said receiving surface for forming separate loosely coherent mats from said band;

stacking means ahead of said mat-forming means in said direction for applying at least one lamina to each of said loosely coherent mats;

a press ahead of said stacking means in said direction and having at least two platens displaceable toward ech other for compressing each loosely coherent mat carrying said lamina between pressing surfaces of said platens; and means for heating said platens only upon incipient operation of said press to bond said mats and laminae to coherency and for cooling said platens prior insertion of each mat and the respective laminae between said surfaces.

2. The apparatus defined in claim 1 wherein said press platens are provided with at least one spacer body therebetween to hold said platens at a predetermined distance during pressing.

3. The apparatus defined in claim 1 wherein said means for heating and cooling said platens includes a plurality of bores formed in each of said platens, said bores being substantially parallel to said pressing surfaces and being of larger diameter near the center of said platens than near the edges thereof, and manifold means for selectively supplying a heating fluid and a cooling fluid to said bores.

4. The apparatus defined in claim 1 wherein the dispensing means comprises an upstream and a downstream hopper spaced along said surface for dispensing fine comminuted material, and a central hopper located therebetween dispensing relatively coarse comminuted material upon said surface.

5. The apparatus defined in claim 1 further comprising a dust-free chamber, said stacking means operating in said chamber.

6. The apparatus defined in claim 5 wherein said chamber is maintained at a superatmospheric pressure.

References Cited

UNITED STATES PATENTS

| | | | |
|---|---|---|---|
| 2,725,091 | 11/1955 | Miner et al. | 156—583X |
| 2,923,030 | 2/1960 | Himmelheber et al. | 156—369X |
| 3,332,819 | 7/1967 | Siempelkamp | 156—375 |
| 3,428,505 | 2/1969 | Siempelkamp | 156—373X |
| 3,490,115 | 1/1970 | Owens et al. | 156—62.2X |

LELAND A. SEBASTIAN, Primary Examiner

U.S. Cl. X.R.

156—62.2, 374, 375, 583